Jan. 5, 1932.   J. S. RUTLEDGE   1,839,997
TIRE CARRIER
Filed April 25, 1928   2 Sheets-Sheet 1

J. S. Rutledge
INVENTOR.

BY James F. Splain

ATTORNEY.

Jan. 5, 1932.  J. S. RUTLEDGE  1,839,997
TIRE CARRIER
Filed April 25, 1928   2 Sheets-Sheet 2
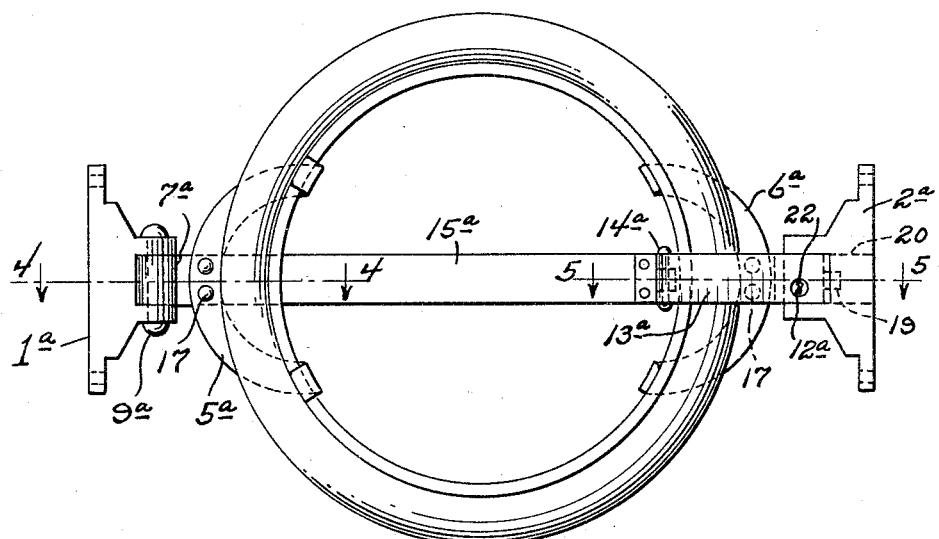
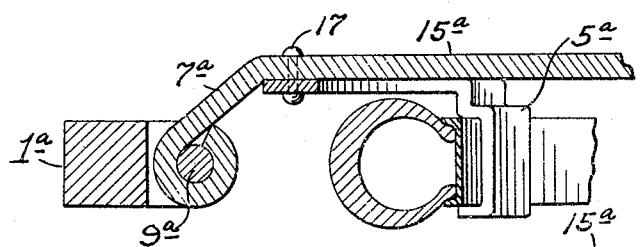
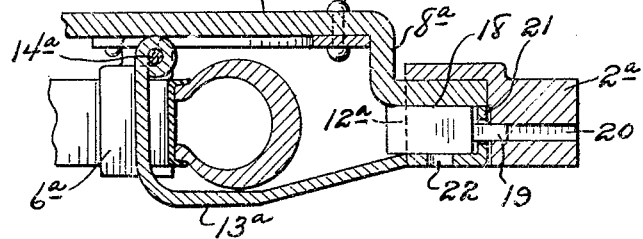
J. S. Rutledge
INVENTOR.
BY James F. Splain
ATTORNEY.

Patented Jan. 5, 1932

1,839,997

UNITED STATES PATENT OFFICE

JAMES S. RUTLEDGE, OF MONROE CITY, MISSOURI

TIRE CARRIER

Application filed April 25, 1928. Serial No. 272,780.

The object of my present invention is the provision of a tire carrier adapted to be mounted transversely at the rear end of an automobile and to serve the auxiliary purpose of a guard for the door of a rear compartment in an automobile body; it being necessary to swing the carrier to open position for the removal of a rim and tire from the carrier and also for the opening of the said compartment door.

Other objects and practical advantages of the invention will be fully understood from the following description and claim when the same is read in connection with the drawings, accompanying and forming part of this specification, in which:

Figure 3 is an elevation of a modification.

Figures 4 and 5 are fragmentary sections on the lines 4—4 and 5—5, respectively, of Figure 3.

Similar numerals designate corresponding parts in Figures 1 and 2 to which reference will first be made.

I show in both figures brackets 1 and 2 adapted to be affixed in opposed and spaced relation to appropriate parts of an automobile. I also show in said figures a tire 3 and a rim 4 in conventional association with the tire.

Figure 1:
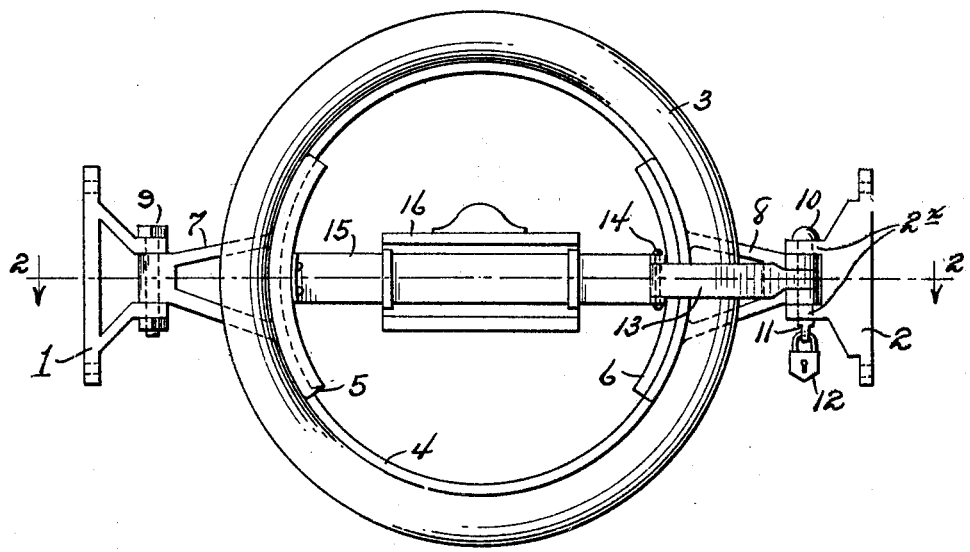
Figure 1 is an elevation of one embodiment of my invention.
Figure 2:
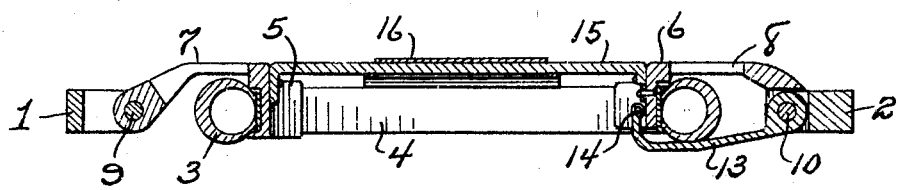
Figure 2 is a section on the line 2—2 of Figure 1.

In addition to the brackets 1 and 2, my improvement comprises a channeled rim-receiver 5 which in elevation describes a part of a circle, Figure 1, and a rim receiver 6 which is flanged at its forward side only, Figure 2, but which in elevation also describes a part of a circle, Figure 1. The said rim receivers 5 and 6 are provided with outwardly extending arms 7 and 8, respectively. The arm 7 is permanently connected in pivotal manner to the adjacent bracket 1 through the medium of a pintle 9 which is not removable. The arm 8, however, is detachably connected to the bracket 2 by a headed bolt 10 that is adapted to be readily lifted from the illustrated position, Figure 1, and as readily replaced in said position.

One end 11 of the bolt 10 is apertured to receive the bow of a padlock 12; and it will also be noticed that the pin or bolt 10 serves to fasten in closed position the outer end of a lock member 13. Said lock member 13 serves to retain the rim and tire in the carrier, its inner end being pivotally and permanently connected to the receiver 6, as designated by 14 in Figures 1 and 2. The outer apertured portions of the arm 8 are adapted to be arranged in the bifurcated portion $2^x$ of the bracket 2, and the outer apertured portion of the lock member 13 is adapted to be detachably secured by the pin or bolt 10 between the apertured portions of the arm 8 and also between the apertured furcations of the bracket 2.

The receivers 5 and 6 are preferably connected together by an interposed bar 15, and said bar 15 is utilized to carry a license plate 16.

It will be apparent from the foregoing that with the parts positioned as shown in Figures 1 and 2 the compartment door hereinbefore alluded to will be adequately guarded and at the same time the rim and tire will be securely held against unauthorized removal from the carrier.

When, however, the lock 12 is opened and removed, and the pin or bolt 10 is withdrawn, the lock member 13 may be swung to open position for the ready removal of the rim and tire and the ready placing of a fresh rim and tire, and if desired the carrier as a whole may be swung on the pintle 9 to afford ready access to and permit of the free opening of the compartment door normally guarded by the carrier.

In the modification, Figures 3–5, the rim receivers 5a and 6a have arms 7a and 8a on a connecting bar 15a to which said receivers are connected as designated by 17. The arm 7a is permanently connected in pivotal manner at 9a to the adjacent bracket 1a. The arm 8a, however, carries a key-controlled lock 12a adapted to seat in a recess 18 in the arm 8a and including a bolt 19 adapted to be projected into and retracted from a keeper 20 in the bracket 2a. The modification also includes a lock member 13a. This latter is pivotally connected at 14a to the bar 15a and is provided with an apertured arm 21 to receive the bolt 19, Figure 5, and is also provided with an opening 22 to expose the key hole of the lock 12a.

The modification, Figures 3–5, is possessed of all the advantages ascribed to the embodiment shown in Figures 1 and 2, the retraction of the bolt 19 of the lock 12a permitting of the lock member 13a being swung to open position for the removal of the rim and tire or the placing of a fresh rim and tire, and also permitting of the carrier as a whole being swung to open and closed positions.

I prefer one or the other of the embodiments illustrated. I do not desire, however, to be understood as limiting myself to any specific embodiment, my invention being defined by my appended claim within the scope of which changes may be made without departure from my invention.

Having described my invention, what I claim and desire to secure by Letters Patent, is:

In combination spaced brackets, a tire carrier comprising spaced rim receivers connected together and having outwardly extending arms, means pivotally connecting one arm to the adjacent bracket, means including a lock-controlled bolt engaging the other bracket for locking the other arm to said other bracket, and swingable means also locked by said bolt to said other bracket for securing a rim and tire in the receivers; the said rim and tire securing means being pivoted at its inner end and locked at its outer end, and one of the said tire and rim receivers being flanged at both sides and the other being flanged at one side only.

In testimony whereof I affix my signature.

JAMES S. RUTLEDGE.